United States Patent [19]
Philipp et al.

[11] 3,939,048
[45] Feb. 17, 1976

[54] PROCESS FOR MAKING ANHYDROUS METAL HALIDES

[75] Inventors: Warren H. Philipp, North Olmsted; Stanley J. Marsik, Fairview Park; Charles E. May, Rocky River, all of Ohio

[73] Assignee: The United States of America as represented by the United States National Aeronautics and Space Administration Office of General Counsel-Code GP, Washington, D.C.

[22] Filed: Nov. 27, 1974

[21] Appl. No.: 527,728

[52] U.S. Cl. ................. 204/157.1 H; 250/527
[51] Int. Cl.² ............................................ B01J 1/10
[58] Field of Search ...................... 204/157.1 H

[56] References Cited
UNITED STATES PATENTS

| | | |
|---|---|---|
| 2,604,442 | 7/1952 | Lambert et al. ............ 204/157.1 R |
| 3,284,329 | 11/1966 | Aftandilian ................ 204/157.1 R |

*Primary Examiner*—Howard S. Williams
*Attorney, Agent, or Firm*—N. T. Musial; G. E. Shook; J. R. Manning

[57] ABSTRACT

A process for the preparation and isolation of high purity anhydrous lower valence state metal halides comprising dissolving the corresponding higher valence state metal halide of the desired lower valence state metal halide in an organic liquid, which is selected such that the higher valence state metal halide is soluble therein and the lower valence state metal halide is insoluble therein, and subjecting the solution to high energy radiation which reduces the higher valence state metal halide to its corresponding lower valence state metal halide, at a temperature in the range of from about 0°C. to about room temperature.

10 Claims, 1 Drawing Figure

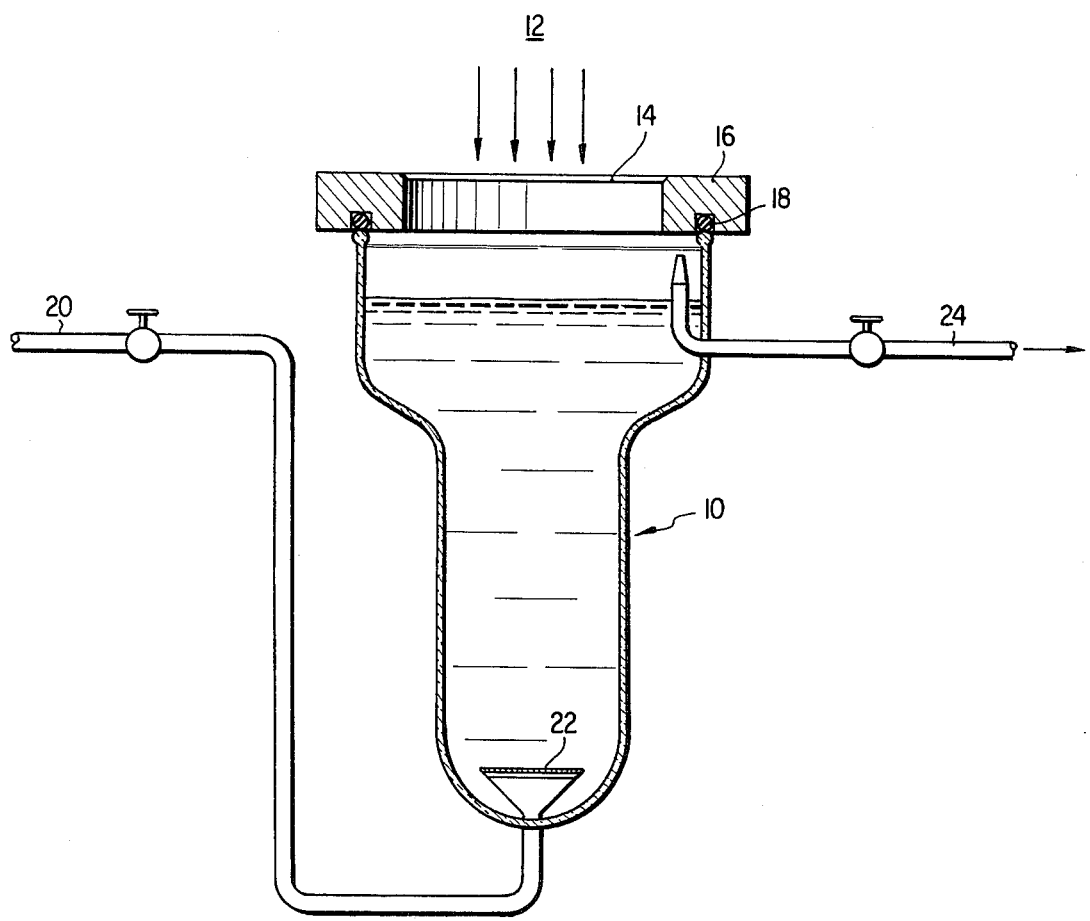

PROCESS FOR MAKING ANHYDROUS METAL HALIDES

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

1. Field of the Invention

The invention relates to a novel process for the preparation and isolation of high purity lower valence state anhydrous metal halides using high energy radiation.

2. Description of the Prior Art

Prior to the present invention, lower valence state metal halides were prepared by reducing a higher valence state halide in the presence of hydrogen at temperatures in the range of from about 800°C. to about 1200°C. At these high temperatures, however, sever corrosive conditions are encountered which render this method undesirable. Lower valence state halides have also been prepared by reducing the corresponding higher valence state halide at low temperatures by employing reducing agents, such as zinc or aluminum. The use of such a reducing agent, however, results in the production of a by-product which affects the purity of the product.

U.S. Pat. No. 3,127,334 to Heffels discloses a process for preparing lower valence state metal halides or oxyhalides which comprises contacting the corresponding higher valence state metal halide or oxyhalide with gaseous hydrogen at a temperature substantially lower than the temperature necessary for the reactants to react spontaneously but above the condensation temperature of the reactants, and subjecting the gaseous mixture to ultra-violet radiation.

U.S. Pat. No. 2,859,162 to Bown et al. discloses a process for reducing titanium tetrachloride which comprises subjecting a mixture of vaporized titanium tetrachloride and a vaporized metal sensitizing agent, such as mercury, to radiant energy having a frequency corresponding to the frequency of the resonance line of the metal sensitizing agent.

SUMMARY OF THE INVENTION

The disadvantages and limitations of the prior art are alleviated by the process of the present invention. In accordance with the present invention high purity anhydrous lower valence state metal halides are prepared by reducing the corresponding higher valence state metal halide using high energy radiation.

Further, in accordance with the present invention, a higher valence state metal halide is dissolved in an organic liquid and the solution is subjected to high energy radiation at low temperature conditions and without the use of either a metallic reducing agent or a reducing gas.

For a further understanding of the present invention and for advantages and features thereof, reference may be made to the following description in conjunction with the following drawing which show, by way of example, the preferred embodiments of the present invention.

BRIEF DESCRIPTION OF THE DRAWING

The FIGURE is a side elevational view of an apparatus which can be used in preparing high purity anhydrous lower valence metal halides in accordance with the process of the present invention.

DESCRIPTION OF THE INVENTION

In accordance with the present invention, high purity anhydrous lower valence state metal halides are prepared by dissolving the corresponding higher valence state metal halide in an organic liquid and subjecting the solution to high energy radiation. The high energy radiation causes the higher valence state metal halide in solution to be reduced to the lower valence state metal halide. Because the higher valence state metal halides are usually more covalent or less ionic in character than the reduced lower valence state metal halides they are soluble in certain organic liquids, whereas the more ionic or less covalent reduced metal halide is relatively insoluble in the same liquid and is easily removed as a precipitate.

Certain organic liquids generate reducing species when they are irradiated. These reducing species include hydrogen atoms, solvated electrons and possibly organic radicals. Some of these organic liquids that are radiolytically reducing include hydrocarbons, such as heptane, toluene and the like, heterocyclic ethers, such as tetrahydrofuran and the like, primary alcohols, such as ethanol and the like, and secondary alcohols, such as 2-propanol and the like.

Solutions of higher valence state metal halides in liquid hydrocarbons provide an oxygen and water free system. These solutions are self-dehydrating, in that small amounts of water which may be present are removed by hydrolysis of the metal halide with formation of insoluble oxyhalides and hydrated oxides which can be readily removed by centrifugation and decantation before the radiolysis is begun. Since many higher valence state metal halides are not soluble in hydrocarbons, more polar organic liquids, such as tetrahydrofuran, must be employed. In each case, the particular organic solvent used is selected on the basis that the higher valence state metal halide starting material will be soluble therein, and the reduced lower valence state metal halide product will be insoluble therein and will deposit as a precipitate which can be easily removed from the other reaction products and excess reactants which remain in solution.

The reduction process is carried out at a temperature in the range of from about 0°C. to about room temperature. The high energy radiation used to effect the reduction may be in the form of, for example, high energy electrons or protons. The energy of the radiation employed should be at least about 0.5 million electron volts, preferably at least about 1.0 million electron volts, and more preferably at least about 2.0 million electron volts.

The high purity anhydrous lower valence state metal halides prepared in accordance with the novel process of the present invention find utility in a number of industrial applications. For example, anhydrous tin(II) halides are employed in electric arc vapor lamps, and lower valence state titanium halides are used as catalysts for the polymerization of unsaturated monomers, such as alpha olefin polymerization.

The reduction process of the present invention will be further described with respect to the accompanying drawing wherein an apparatus is shown that is suitable for use in practicing the present invention.

In accordance with the process of the present invention, a known amount of anhydrous higher valence state metal halide is added to an organic liquid in an Erlenmeyer flask containing a magnetic stirrer. The flask is immediately stoppered and the mixture is stirred for several minutes to effect solution. The solution is then centrifuged to remove small amounts of insoluble material which may have formed by the hydrolysis of the higher valence state metal halide with the small amounts of water which may be present. The liquid solution is then decanted into the glass reaction vessel 10 shown in the drawing. The solution is then irradiated by a beam of high energy electrons 12 through titanium foil 14 approximately 0.005 cm. thick which is attached to brass ring 16 having rubber O-ring 18 therein to assure that the vessel 10 is completely airtight. During irradiation the solution is agitated by passing an unreactive gas, such as argon, through inlet tube 20 and through a glass frit 22 at the base of the reaction vessel. The unreactive gas is removed from the reaction vessel by means of outlet tube 24. The contents of the reaction vessel are maintained at a temperature in the range of from about 0°C. to about room temperature during irradiation by immersing the vessel in a thermostatically controlled alcohol-water bath, not shown. After irradiation, the precipitated lower valence state metal halide is removed by centrifugation and decanting.

A more complete appreciation of the invention will be realized by reference to the following specific examples relating to specific compounds and the processes for preparing them. The following examples are not intended to limit the invention disclosed herein except to the extent that limitations are specifically stated or to the extent to which limitations appear in the appended claims.

EXAMPLES 1–10

A known amount of anhydrous, fuming (certified) $SnCl_4$ was added to a good commercial heptane (b.p. 96°–97°C.) stored over Drierite to prepare 0.15 to 3.0 M solutions in an Erlenmeyer flask containing a magnetic stirrer. The flask was immediately stoppered and the mixture stirred for several minutes to effect solution. The solution was then centrifuged to remove small amounts of insoluble material such as that formed by the hydrolysis of the $SnCl_4$ with the small amounts of water which may be present. The clear liquid, total volume 500 milliliters, was decanted into a reaction vessel such as that shown in the accompanying drawing.

The solutions were irradiated by 2-million-electron-volt electrons from a Dynamitron accelerator with a beam current of 20 microamperes and a total dose of 0.15 coulomb. The solution was agitated during irradiation by passing an unreactive gas, such as argon, through a glass frit at the base of the reaction vessel. The contents of the reaction vessel were maintained at 20°C. or 0°C. during irradiation by immersing the vessel in a thermostatically controlled alcohol-water bath.

After irradiation the precipitated $SnCl_2$ (about 10 to 20 g.) was removed by centrifuging and decanting the heptane containing unreacted $SnCl_4$ in solution. The $SnCl_2$ was washed twice with hot toluene and filtered on a sintered glass filter. Because of the sensitivity of the freshly prepared $SnCl_2$ to atmospheric oxidation and its hydroscopic nature, the $SnCl_2$ in the filter was not allowed to dry, but instead, the $SnCl_2$, still wet with toluene, was transferred to a drying tube and dried in vacuum at 100°C. for about 10 hours. The dried $SnCl_2$ was then transferred as quickly as possible to a stoppered weighing bottle, weighed and analyzed immediately by both X-ray diffraction and iodometry.

X-ray diffraction of the $SnCl_2$ samples indicated the presence of only anhydrous $SnCl_2$. The iodometric equivalent of the $SnCl_2$ ranged from 97.1 to 99.4 percent (see Table I below). The major impurity content probably arose from the unreacted $SnCl_4$ in solution remaining adsorbed on the $SnCl_2$ precipitate. When the final concentration of the $SnCl_4$ was low, as in Example 1, the iodometric equivalent of the product corresponded to a purity of at least 99 percent $SnCl_2$. Contamination of the $SnCl_2$ increased as more concentrated $SnCl_4$ solutions were used at the same total dose. At the maximum initial $SnCl_4$ concentration of 3.0 moles per liter in Example 8, the iodometric equivalent corresponded to only 97.1 percent $SnCl_2$. Moreover, the observed darkening of the hot toluene used to wash the product is indicative of a Friedel-Crafts reaction product. This product probably originated from the reaction of hot toluene with unused $SnCl_4$ adsorbed on the freshly precipitated $SnCl_2$. In these cases a pink discoloration persisted in the final product after the vacuum drying operation. It is believed that this colored impurity is a major contaminant of the final $SnCl_2$ product. It is suggested that in order to eliminate this contamination, the removal of $SnCl_4$ on the $SnCl_2$ precipitate be accomplished by refluxing with an aliphatic hydrocarbon (heptane) instead of by washing with hot toluene.

As shown in Table I, energy yield increases with $SnCl_4$ concentration reaching the highest value in Example 8 of 3.1 molecules per 100 electron volts at the highest $SnCl_4$ concentration used (3.0 moles per liter). Essentially no effect of total dose (0.10 to 0.20 coulomb) and beam current (5 to 20 $\mu A$) on energy yield was observed and, therefore, these results are not tabulated. As seen from Examples 9 and 10, a slight increase in energy yield was noticed when the irradiation was done at 0°C. instead of at 20°C. As shown in Table I, the energy yield doubles for a twentyfold increase from 0.15 to 3.0 initial molar concentration of $SnCl_4$ from Examples 1 to 8.

TABLE I

PREPARATION OF $SnCl_2$ FROM A HEPTANE SOLUTION OF $SnCl_4$

| Example Number | Initial $SnCl_4$ concentration, mole/liter | Energy yield, molecule/100 eV | Purity of $SnCl_2$ (iodimetric equivalent), percent | Final $SnCl_4$ concentration,* mole/liter |
|---|---|---|---|---|
| 1 | 0.15 | 1.6 | 99.4 | 0.05 |
| 2 | 0.30 | 1.9 | 98.8 | 0.18 |
| 3 | 0.50 | 2.1 | 98.6 | 0.37 |
| 4 | 0.70 | 2.2 | *** | 0.56 |
| 5 | 1.00 | 2.4 | 98.2 | 0.85 |

TABLE I-continued

PREPARATION OF SnCl₂ FROM A HEPTANE SOLUTION OF SnCl₄

| Example Number | Initial SnCl₄ concentration, mole/liter | Energy yield, molecule/100 eV | Purity of SnCl₂ (iodimetric equivalent), percent | Final SnCl₄ concentration,* mole/liter |
|---|---|---|---|---|
| 6 | 1.50 | 2.6 | *** | 1.30 |
| 7 | 2.00 | 2.8 | 97.6 | 1.80 |
| 8 | 3.00 | 3.1 | 97.1 | 2.80 |
| 9 | 0.50 | 2.2** | *** | 0.36 |
| 10 | 1.00 | 2.6** | *** | 0.84 |

[Electron energy, 2 meV; dose, 0.15 coulomb; beam current 20μA; irradiation temperature 20°C. unless otherwise specified.]

*Calculated from initial concentration and yield.
**Irradiations carried out at 0°C.
***Titrations were not run on the product to determine the iodimetric equivalent.

EXAMPLE 11

Following the procedure of Examples 1–10, tin(IV) iodide was added to heptane and the solution was stirred, centrifuged, and irradiated. After irradiation, precipitated tin(II) iodide was removed from the solution, washed, filtered, and dried. The dried tin(II) iodide was analyzed by X-ray diffraction and found to be pure.

EXAMPLE 12

Following the procedure of Examples 1–10, titanium-(IV) chloride was added to heptane and the solution was stirred, centrifuged and irradiated. After irradiation, precipitated titanium(III) chloride and titanium-(II) chloride were removed from the solution, washed, filtered, and dried. The dried precipitate was analyzed by X-ray diffraction and found to contain a pure mixture of titanium(III) chloride and titanium(II) chloride. If the irradiation time had been shorter, only titanium-(III) chloride would have been formed. Likewise, if the irradiation time had been longer, the titanium(III) chloride would have been reduced to titanium(II) chloride.

EXAMPLE 13

Following the procedure of Examples 1–10, iron(III) chloride was added to tetrahydrofuran and the solution was stirred, centrifuged, and irradiated. After irradiation, precipitated iron(II) chloride was removed from the solution, washed, filtered, and dried. The dried iron(II) chloride was analyzed by X-ray diffraction and found to be pure.

EXAMPLE 14

Following the procedure of Examples 1–10, copper-(II) bromide was added to n-butanol and the solution was stirred, centrifuged, and irradiated. After irradiation, precipitated copper(I) bromide was removed from the solution, washed, filtered, and dried. The dried copper(I) bromide was analyzed by X-ray diffraction and found to be pure.

What is claimed is:

1. A process for the preparation and isolation of high purity anhydrous lower valence state metal halides comprising
   dissolving the corresponding higher valence state metal halide of the desired lower valence metal halide in an organic liquid, said organic liquid being selected such that the higher valence state metal halide is soluble therein and the lower valence state metal halide is insoluble therein, and
   subjecting the solution to high energy radiation which reduces the higher valence state metal halide to its corresponding lower valence state metal halide at a temperature in the range of from about 0°C. to about room temperature.

2. The process of claim 1 wherein the high energy radiation is a beam of high energy electrons.

3. The process of claim 2 wherein the high energy electrons have an energy of at least about 0.5 million electron volts.

4. The process of claim 3 wherein the high energy electrons have an energy of at least about 1.0 million electron volts.

5. The process of claim 4 wherein the high energy electrons have an energy of at least about 2.0 million electron volts.

6. The process of claim 1 wherein the higher valence state metal halide is tin(IV) chloride, the organic liquid is heptane, and the lower valence state metal halide is tin(II) chloride.

7. The process of claim 1 wherein the higher valence state metal halide is tin(IV) iodide, the organic liquid is heptane, and the lower valence state metal halide is tin(II) iodide.

8. The process of claim 1 wherein the high valence state metal halide is titanium(IV) chloride, the organic liquid is heptane, and the lower valence state metal halide is titanium(III) chloride or titanium(II) chloride or a mixture thereof.

9. The process of claim 1 wherein the higher valence state metal halide is iron(III) chloride, the organic liquid is tetrahydrofuran, and the lower valence state metal halide is iron(II) chloride.

10. The process of claim 1 wherein the higher valence state metal halide is copper(II) bromide, the organic liquid is n-butanol, and the lower valence state metal halide is copper(I) bromide.

* * * * *